Figure 1:
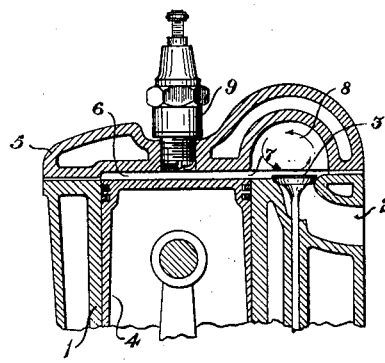

Nov. 20, 1928.

W. H. HILL 1,692,339

INTERNAL COMBUSTION ENGINE

Filed April 20, 1927   2 Sheets-Sheet 1

Inventor
William H. Hill

By Frease and Bond
Attorneys

Nov. 20, 1928. 1,692,339
W. H. HILL
INTERNAL COMBUSTION ENGINE
Filed April 20, 1927  2 Sheets-Sheet 2

Inventor
William H. Hill

Patented Nov. 20, 1928.

1,692,339

UNITED STATES PATENT OFFICE.

WILLIAM H. HILL, OF CANTON, OHIO.

INTERNAL-COMBUSTION ENGINE.

Application filed April 20, 1927. Serial No. 185,170.

The invention relates to internal combustion engines and more particularly to the design or shape of the combustion chamber, and is applicable to various types of internal combustion engines including the L-head, T-head, overhead valve and sleeve valve types.

In the present types of combustion chambers such as are in general use, the mixture after compression is ignited by a spark produced from a spark plug located within the combustion chamber. The propagation of the flame extends from the spark plug more or less radially, raising the pressure as it progresses, thus burning the more distant parts of the mixture under a higher pressure than the intermediate portions.

Hydrocarbons are susceptible to disassociation under certain temperature and pressure conditions, and the regular increase of pressure accompanying the flame arrives at a point, depending on the initial compression, where this disassociation takes place, causing extreme momentary pressure and separation of molecular carbon.

In reverting from a gaseous state to a solid form the carbon releases extreme heat to the walls of the combustion chamber and although the greater part of the carbon passes out of the combustion chamber with the exhaust, a certain amount is always retained by the oily surfaces of the combustion chamber. This carbon not only causes considerable loss of power by not being burned in the mixture, but the carbon coating upon the walls of the combustion chamber produces earlier detonation or "carbon knock".

Various means have been employed to control detonation, including the use of so-called "dopes" which is common at the present time. Attempts have been made to attain the same effect by producing an agitated or turbulent condition of the mixture at the time of ignition; and experimentally by the use of several spark plugs equally spaced around the combustion chamber and simultaneously fired.

Examination has shown that the "dopes" as well as the employment of diluents, such as exhaust gases and water vapor, are deterrents or poisons to the catalectic dehydrogenization process. In the use of the multiple spark plugs it appears that the last portion of the mixture to be burned, i. e. under higher pressure, is almost surrounded by burnt gases and, therefore, is mostly not in contact with the walls of the combustion chamber. From the above facts it may be deduced that the walls have some catalectic effect upon the normal combustion.

The object of the improvement is to provide a combustion chamber which will permit of the use of much higher compression than that now in common use with the elimination of the detonation or "knocks" and the consequent elimination of the formation of carbon on the piston and walls of the combustion chamber; this use of higher compression producing a more economical engine, as the mean effective pressure developed from a given weight of mixture is practically a multiple of the compression ratio.

The above and other objects I attain by providing a combustion chamber in which the ignition of the first part of the mixture is produced in the hottest part of the chamber preferably over the center of the piston; the burning of this part of the mixture being under the initial compression pressure gradually raising in pressure, but before it reaches the detonation stage leading the combustion to a second chamber wherein the mixture is in a high state of rotation i. e. great angular velocity.

The mixture in this second chamber will be ignited by a sheet of flame enveloping the central portion and at the same time insulating the central portion from the walls of the chamber during the combustion at the higher pressure developed.

Figure 2:
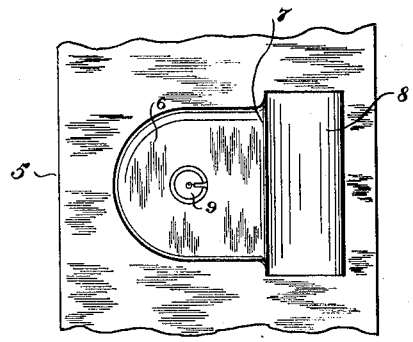
Figure 3:
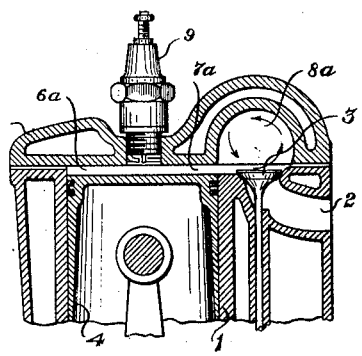
Figure 4:
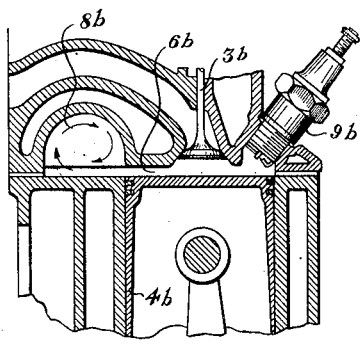
Figure 5:
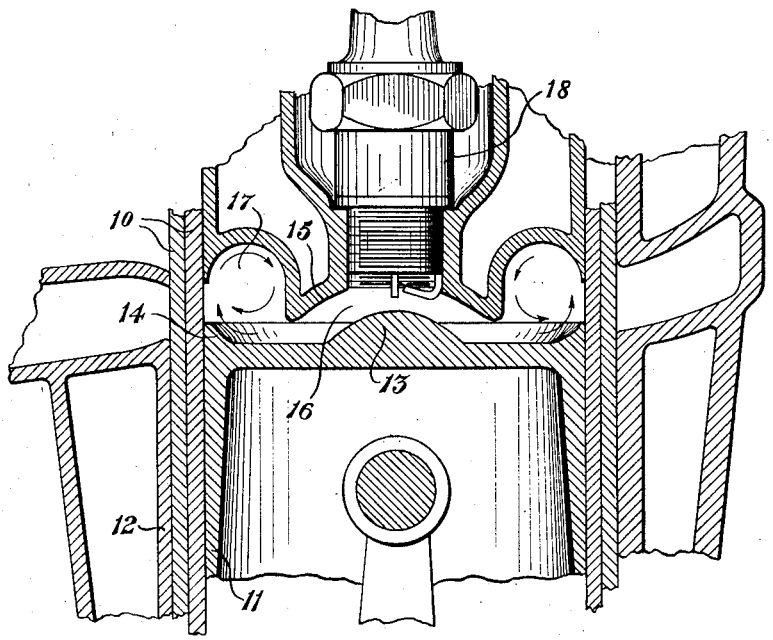

An embodiment of the invention is illustrated in the accompanying drawings, in which Figure 1 is a sectional elevation of the upper portion of the cylinder of an internal combustion engine of the L-head type, constructed in accordance with the invention;

Fig. 2, a bottom plan view of the head, showing the improved combustion chamber;

Fig. 3, a view similar to Fig. 1, showing a slightly modified form of cylinder;

Fig. 4, a fragmentary sectional view of the upper portion of a cylinder showing the application of the invention to an overhead valve type of engine; and Fig. 5, a similar view showing the application of the invention to a sleeve valve engine.

Similar numerals refer to similar parts throughout the drawings.

Referring first to Figures 1 and 3 inclusive, the invention is shown as applied to an L-head type of engine in which the cylinder 1 may have the inlet and exhaust apertures located at one side thereof, either of which may be indicated at 2 and controlled by the usual valve 3.

The piston 4 may be adapted to move to the upper end of the cylinder as shown in Fig. 1 or to a point slightly spaced therefrom as shown in Fig. 2.

The head 5 as shown in Figs. 1 and 2 may be provided with a shallow chamber 6 directly above and communicating with the upper end of the cylinder bore and forming the initial ignition or combustion chamber.

This chamber, as best shown in Fig. 2, opens out at one side as shown at 7 into an enlarged, substantially half-round chamber 8 located above the valves 3 and forming a secondary ignition or combustion chamber.

The mixture in chamber 8 will be rotated by being expelled from the cylinder at right angles to the cylinder axis and will be accelerated by the expansion of the burnt gases in chamber 6, during the firing As shown in Fig. 3, the upper end of the cylinder may form the initial ignition or combustion chamber $6^a$ which communicates, as at $7^a$ with the secondary ignition chamber $8^a$.

In each case the spark plug 9 is preferably located in the center of the initial combustion chamber or directly above the center of the piston.

As the charge is compressed by the upward movement of the piston, the greater amount of mixture will be forced from the initial chamber into the secondary chamber in which it will be rapidly rotated around the longer axis of said secondary chamber at the instant of firing.

As the spark is fired, the mixture within the initial chamber will be first ignited and this portion of the mixture will be burned under the initial compression pressure, the pressure gradually raising, but before it reaches the detonation stage the flame will be projected into the secondary chamber wherein the mixture will be burned by a sheet of flame issuing from the initial chamber and enveloping the central portion of the mixture in the secondary chamber, while the same is in a high state of rotation accelerated by the expansion of the burnt gases from the initial chamber.

In Fig. 4 is shown the application of the invention to an overhead valve type of engine in which the valve $3^b$ is located above the piston. The initial chamber $6^b$ is formed in the head, above the piston $4^b$ and communicates at one side with the secondary chamber $8^b$.

With this type of engine it is impossible to place the spark plug $9^b$ directly over the center of the piston, owing to the location of the valve. It is, therefore, desirable to locate the spark plug at one side of the initial chamber $6^b$ preferably upon the side opposite to the secondary chamber $8^b$ in order to ignite the mixture within the initial chamber before the flame passes into the secondary chamber. Otherwise the operation of this type of engine is substantially the same as described with regard to the L-head type.

The invention may also be applied to engines of the type known as the F-head, in which the inlet valve is in the head and the exhaust valve is in the pocket. Such an engine is a combination of the L-head and overhead types illustrated and described herein, and the invention is applicable thereto without any material change from the construction illustrated in connection with the L-head and overhead types of engines.

In Fig. 5 the invention is illustrated as applied to a sleeve valve motor in which the usual sleeves 10 are slidably mounted around the piston 11 and within the cylinder 12.

The piston head may have the central convex portion 13 and the curved peripheral rim 14.

The cylinder head may be provided with the central concave portion 15, forming, together with the convex portion 13 of the piston head, the initial chamber 16 which communicates around its periphery with the annular enlarged secondary chamber 17.

The curved rim 14 of the piston head will assist in producing a rotating motion of the mixture as it passes from the initial chamber into the secondary chamber.

In this case as well as in the L-head motor, the spark plug 18 will be located in the center of the initial chamber directly over the center of the piston.

The action will be substantially the same in this case as in the other types of motors above described, excepting that the mixture is discharged peripherally from the initial chamber instead of from one side thereof.

It should be understood that a T-head motor may be formed in the same manner as the L-head, excepting that a secondary chamber will be provided at each side of the initial chamber, since one valve is located upon each side of the cylinder in the T-head motor.

It should be understood that the opening 7 or $7^a$ between the initial and secondary ignition chambers, as shown in the L-head motor, should be at least as great as the area of the inlet valve. This construction would also be necessary in the T-head motor.

I claim:

1. An internal combustion engine including a cylinder, a piston reciprocating in the cylinder, a substantially flat initial combustion chamber consisting of an extension of one end of the cylinder bore, spark ignition means in the initial chamber, a secondary combustion chamber of greater capacity and height than the initial chamber and of a height substantially equal to its width, located entirely at one side of the end of the cylinder, and communicating tangentially with one side of the initial chamber whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

2. An internal combustion engine including a cylinder, a piston reciprocating in the cylinder, a substantially flat initial combustion chamber consisting of an extension of one end of the cylinder bore, spark ignition means in the initial chamber, a secondary combustion chamber of greater capacity and height than the initial chamber and of a height substantially equal to its width, located entirely at one side of the end of the cylinder, and communicating at its lower portion with one side of the initial chamber whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

3. An internal combustion engine including a cylinder, a piston reciprocating in the cylinder, a substantially flat initial combustion chamber consisting of an extension of one end of the cylinder bore, spark ignition means in the initial chamber, a secondary combustion chamber of greater capacity and height than the initial chamber and of a height substantially equal to its width, located entirely at one side of the end of the cylinder, and communicating tangentially with one side of the initial chamber, whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

4. An internal combustion engine including a cylinder, a piston reciprocating in the cylinder, a substantially flat initial combustion chamber consisting of an extension of one end of the cylinder bore, spark ignition means in the initial chamber, a secondary combustion chamber of greater capacity and height than the initial chamber and of a height substantially equal to its width, located entirely at one side of the end of the cylinder, and communicating tangentially with one side of the initial chamber, the secondary chamber being rounded in cross section whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

5. An internal combustion engine including a cylinder, a piston reciprocating in the cylinder, a substantially flat initial combustion chamber consisting of an extension of one end of the cylinder bore, spark ignition means in the initial chamber, a secondary combustion chamber of greater capacity and height than the initial chamber and of a height substantially equal to its width, located entirely at one side of the end of the cylinder, and communicating at its lower portion with one side of the initial chamber, the secondary chamber being rounded in cross section whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

6. An internal combustion engine including a cylinder, a piston reciprocating in the cylinder, a substantially flat initial combustion chamber consisting of an extension of one end of the cylinder bore, spark ignition means in the initial chamber, a secondary combustion chamber of greater capacity and height than the initial chamber and of a height substantially equal to its width, located entirely at one side of the end of the cylinder, and communicating tangentially with one side of the initial chamber, the secondary chamber being half-round in cross section whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

7. An internal combustion engine including a cylinder, a piston reciprocating in the cylinder, a substantially flat initial combustion chamber consisting of an extension of one end of the cylinder bore, spark ignition means in the initial chamber, a secondary combustion chamber of greater capacity and height than the initial chamber and of a height substantially equal to its width, located entirely at one side of the end of the cylinder, and communicating at its lower portion with one side of the initial chamber, the secondary chamber being half-round in cross section whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

8. An internal combustion engine including a cylinder, a piston reciprocating in the cylinder, a substantially flat initial combustion chamber consisting of an extension of one end of the cylinder bore, spark ignition means centrally located in the initial chamber, a secondary combustion chamber of greater capacity and height than the initial chamber and of a height substantially equal to its width located entirely at one side of the end of the cylinder and communicating tangentially with one side of the initial chamber whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

9. An internal combustion engine including a cylinder, a piston reciprocating in the cylinder, a substantially flat initial combustion chamber consisting of an extension of one end of the cylinder bore, spark ignition means centrally located in the initial chamber, a secondary combustion chamber of greater capacity and height than the initial chamber and of a height substantially equal to its width, located entirely at one side of the end of the cylinder, and communicating tangentially with one side of the initial chamber, the secondary chamber being rounded in cross section whereby upon the compression stroke of the piston the mixture will be rapidly displaced from the initial chamber and discharged tangentially into the secondary chamber and caused to rotate in the secondary chamber, the rotation being accelerated by expansion of burning gases from the initial chamber, the flame velocity being added to the velocity of the gases rotating in the secondary chamber, causing the same to be enveloped by the flame before the combustion reaches the center of the mass.

In testimony that I claim the above, I have hereunto subscribed my name.

WILLIAM H. HILL.